(12) United States Patent
Ward et al.

(10) Patent No.: US 10,279,525 B2
(45) Date of Patent: May 7, 2019

(54) SYSTEM FOR CO-INJECTION WITH CONTINUOUS INJECTION MOLDING

(71) Applicant: IMFLUX INC., Hamilton, OH (US)

(72) Inventors: Coy Del Ward, Aurora, OH (US); Ralph Edwin Neufarth, Liberty Township, OH (US); Gene Michael Altonen, West Chester, OH (US); Chow-Chi Huang, West Chester, OH (US); Charles John Berg, Jr., Wyoming, OH (US)

(73) Assignee: IMFLUX INC., Hamilton, OH (US)

( * ) Notice: Subject to any disclaimer, the term of this patent is extended or adjusted under 35 U.S.C. 154(b) by 0 days.

(21) Appl. No.: 15/904,098

(22) Filed: Feb. 23, 2018

(65) Prior Publication Data

US 2018/0178425 A1 Jun. 28, 2018

Related U.S. Application Data

(62) Division of application No. 14/962,572, filed on Dec. 8, 2015, now Pat. No. 9,937,647.

(51) Int. Cl.
*B29C 45/16* (2006.01)
*B29C 45/27* (2006.01)
*B29C 45/04* (2006.01)

(52) U.S. Cl.
CPC ............ *B29C 45/27* (2013.01); *B29C 45/045* (2013.01); *B29C 45/16* (2013.01); *B29C 45/164* (2013.01); *B29C 45/1628* (2013.01); *B29C 45/1646* (2013.01); *B29C 45/1679* (2013.01); *B29C 2045/1685* (2013.01); *B29C 2045/1689* (2013.01); *B29C 2045/1698* (2013.01)

(58) Field of Classification Search
None
See application file for complete search history.

(56) References Cited

U.S. PATENT DOCUMENTS

| | | | |
|---|---|---|---|
| 3,759,648 A | 9/1973 | Hunkar | |
| 4,242,073 A | 12/1980 | Tsuchiya et al. | |
| 4,386,043 A | 5/1983 | Takeshima | |
| 4,461,738 A | 7/1984 | Russell | |

(Continued)

FOREIGN PATENT DOCUMENTS

| | | |
|---|---|---|
| EP | 0246512 A2 | 11/1987 |
| EP | 2481547 A1 | 8/2012 |

(Continued)

OTHER PUBLICATIONS

International Search Report and Written Opinion, International Application No. PCT/US2015/064362, dated Aug. 24, 2016.

(Continued)

*Primary Examiner* — Edmund H Lee
(74) *Attorney, Agent, or Firm* — Marshall Gerstein & Borun LLP

(57) ABSTRACT

A carousel-like continuous co-injection molding system includes an arrangement of upper and lower inclined feed channels. Each of the feed channels has a valve therein positioned upstream of an inlet to an associated mold cavity. The valve is controllable so that adjustments may be made in real time to achieve or maintain delivery of molten polymeric material to the mold cavity at constant pressure.

5 Claims, 8 Drawing Sheets

(56) References Cited

U.S. PATENT DOCUMENTS

| | | | |
|---|---|---|---|
| 4,470,796 A | 9/1984 | Stroup et al. | |
| 4,828,778 A | 5/1989 | Gelsomini et al. | |
| 5,028,226 A * | 7/1991 | De'ath | B29C 45/1607 |
| | | | 425/130 |
| 6,042,754 A | 3/2000 | Yang et al. | |
| 6,630,090 B1 | 10/2003 | Nagaoka | |
| 6,755,638 B2 | 6/2004 | Chen et al. | |
| 2002/0084542 A1 | 7/2002 | Suzuki | |
| 2005/0139971 A1 | 6/2005 | Minato | |
| 2008/0251974 A1 | 10/2008 | Simone | |
| 2009/0108497 A1 | 4/2009 | Chaslin | |
| 2011/0045250 A1 | 2/2011 | De Zen | |
| 2012/0231110 A1 | 9/2012 | Ai | |
| 2014/0319725 A1 | 10/2014 | Duffy et al. | |
| 2015/0374115 A1 | 12/2015 | Wilson et al. | |
| 2016/0158980 A1 | 6/2016 | Fitzpatrick | |
| 2016/0158981 A1 | 6/2016 | Fitzpatrick | |
| 2016/0158985 A1 | 6/2016 | Fitzpatrick | |
| 2016/0361743 A1 | 12/2016 | Vielhaber | |
| 2017/0128995 A1 | 5/2017 | Tsay | |
| 2017/0157820 A1 | 6/2017 | Ward et al. | |

FOREIGN PATENT DOCUMENTS

| | | |
|---|---|---|
| WO | WO-03/076160 A1 | 9/2003 |
| WO | WO-2015/077262 A1 | 5/2015 |
| WO | WO-2016/064394 A1 | 4/2016 |

OTHER PUBLICATIONS

Taiwan Patent Application No. 104141221, Office Action, dated Oct. 3, 2018.
International Search Report and Written Opinion, International Application No. PCT/US2015/064361, dated Aug. 31, 2016.

* cited by examiner

SYSTEM FOR CO-INJECTION WITH CONTINUOUS INJECTION MOLDING

CROSS-REFERENCE TO RELATED APPLICATION

The present application is a divisional, under 35 U.S.C. § 120, of U.S. patent application Ser. No. 14/962,572, filed Dec. 8, 2015, now U.S. Pat. No. 9,937,647. The priority application is hereby incorporated by reference.

FIELD OF THE INVENTION

This application relates generally to injection molding systems and, more specifically, to apparatuses and methods for producing co-injection molded parts at low constant pressure by continuously feeding molten polymeric materials to a plurality of mold cavities that rotate about an axis comprising at least a first and second nozzle.

BACKGROUND

Injection molding is a technology commonly used for high-volume manufacturing of parts made of meltable material, most commonly of parts made of thermoplastic polymers. The injection molding process used predominantly in the industry today is intermittent, meaning that all processes occur in a sequential fashion and thus each step must be completed before the next step can begin. A plastic resin, most often in the form of small beads or pellets, is introduced to an injection molding machine that melts the resin beads under heat, pressure, and shear. The now molten resin is forcefully injected into a mold cavity having a particular cavity shape. The injected plastic is held under pressure in the mold cavity, cooled, and then removed as a solidified part having a shape that essentially duplicates the cavity shape of the mold. The process is repeated to produce multiple parts using the same mold. The mold itself may have a single cavity or multiple cavities. If more than one molten material is injected into a mold, the injection molding process is referred to as co-injection.

U.S. patent application Ser. No. 13/774,692, incorporated herein by reference, describes co-injection processes in substantially constant pressure injection molding systems. There are numerous limitations and challenges presented by both intermittent injection molding and co-injection molding. For instance, conventional intermittent injection molding lengthens the cycle time necessary to mold a part due to the need to perform each phase or step sequentially. Also, the production of large quantities of parts using intermittent injection molding requires large equipment to hold the mold closed since the clamp tonnage must simultaneously hold multiple mold cavities closed. Conventional multi-cavity intermittent injection molding systems also occupy a large footprint to accommodate the multiple mold cavities. Conventional co-injection molding presents the manufacturing challenge of maintaining synchronized flow front velocities of the materials introduced to the mold cavity in order to maintain a consistent distribution of materials in the mold cavity. Conventional co-injection molding further requires that the thickness of parts be at least 1 mm to avoid an inner layer from bursting through an outer layer. These and other limitations and challenges, limit the circumstances in which intermittent and co-injection molding processes can be used.

One approach to address the issues with intermittent injection molding is to "compression mold" molded articles. This approach involves: 1) extruding molten polymer; 2) trimming a "plug" of extruded polymer to a predetermined length (to achieve a target volume of polymer); 3) depositing the "plug" into a bottom mold cavity; and 4) compressing an upper mold half in to a bottom mold half to form a molded part. This approach can be accomplished on a continuous rotating platform which enables each step to be accomplished simultaneously, and results in very high production rates and lower costs. However, there are numerous trade-offs. First, the polymer "plug" freezes immediately when contacting the cooled bottom mold half—this results in a noticeable matte or rough surface texture on the molded part (an undesirable quality defect). Second, the molds must be very simple in design to enable the part to be molded by the compressive forces as the upper mold half approaches the bottom mold half—this dramatically limits the part designs that are possible using this molding technique.

An alternate approach is to continually feed the polymer to a plurality of mold cavities arranged in a carousel fashion about a central polymer source. In existing continuous injection molding systems of this nature that have been proposed or put into practice, it is understood that the mold cavities are disposed about the central polymer source in a planar, hub-and-spokes fashion, with the polymer source outlet or nozzle being in the same plane as the inlet of each of the mold cavities. One drawback of this arrangement is the large footprint of manufacturing floor space required to accommodate all of the mold cavities. Another drawback is the amount of energy necessary to propagate the polymer along horizontally-extending feed channels that connect the nozzle and the mold cavities. An additional drawback is the lack of ability to make real-time adjustments to melt pressure. In at least one prior disclosure of a carousel-type continuous molding system, the system had a valve gate actuator for positioning a valve pin that controllably connected the molding cavity to a shooting pot. The valve gate was operated according to a valve gate cam profile for actuation of the valve pin. Because the valve's actuation is dependent upon a cam track, the valve position is dictated by the location of a mold position as it rotates about the carousel. As such, there is no ability to adjust the melt flow to increase or decrease pressure. The only variable determining the rate and pressure by which melt flows into a given mold cavity is the extent to which the valve is open or closed, but with no ability to make fine adjustments at the location of the valve, any pressure adjustments that may be needed would have to be accomplished by adjusting the rate of output of an extruder or other source of molten polymeric material.

SUMMARY OF THE INVENTION

The present disclosure provides solutions to problems presented by both intermittent injection molding and co-injection through use of a substantially constant pressure filling process that also features co-injection.

A new continuous injection molding approach has been enabled by the use of a newly discovered substantially constant pressure filling process that is suitable to produce a high quality part even at very low filling pressures. The new continuous injection molding approach addresses problems with intermittent injection molding. The new process involves: 1) extruding the polymer on a continuous basis into a rotating feeder element; 2) metering the flow of molten polymeric material in to the mold cavity through a valve or metering plate; 3) cooling the polymer in the mold cavity; 4) ejecting the part from the mold cavity; and 5) closing the mold cavity to prepare the mold cavity to receive another "shot" of molten polymeric material. The process is repeated on a continuous basis.

Substantially constant, low pressure injection molding also provides an environment favorable to addressing problems with conventional co-injection molding. When the injection system for each of the two or more materials that are co-injected with one another into a mold cavity maintain constant and equal pressure, the flow rate of each of the materials is also equal in the mold cavity. This provides a more consistent layer thickness, and eliminates the need for highly complex control algorithms, expensive equipment, and time consuming iterative processes to define acceptable process settings to achieve the desired layer thickness. Further, when materials are co-injected at a lower constant pressure into molds made of materials having high thermal conductivity, there is less of a need to provide such a thick outer material to achieve flow of the second material relative to the first. As a result, multi-layer co-injected parts may be achieved having overall thicknesses even less than 0.5 mm, and materials with inferior physical properties may be used as a core material in injection molded parts having a thin wall.

The present invention involves: 1) supplying, by some motivation such as extrusion, a continuous flow of a first molten polymeric material into an upper rotating feeder element; 2) supplying a continuous flow of a second molten polymeric material into a lower rotating feeder element; 3) simultaneously metering the flow of the first molten polymeric material into the mold cavity through a metering plate (or metering gate) or valve, and the flow of the second molten polymeric material into the mold cavity through a metering plate (or metering gate) or valve; 4) cooling the polymers in the mold cavity; 4) ejecting the part from the mold cavity; and 5) closing the mold cavity to prepare the mold cavity to receive another "shot" of molten polymeric materials. The process is repeated on a continuous basis.

Upper feed channels of the continuous co-injection molding system of the present disclosure provide the first molten polymeric material to each mold, while lower feed channels of the continuous co-injection molding system of the present disclosure provide the second molten polymeric material to each mold. It is recognized that the second molten polymeric material may differ from the first molten polymeric material in one or more of a variety of characteristics or attributes, such as color, viscosity, flow rate, melting point, freezing point, and regrind content. A first nozzle supplying the first molten polymeric material to the upper feed channels is located at a first elevation that is higher than a second elevation of a second nozzle supplying the second molten polymeric material to the lower feed channels. The second elevation of the second nozzle may be higher than or equal to a third elevation of the inlets of each of the mold cavities. Thus, each of the upper feed channels of the present invention is arranged at an incline. Each of the lower feed channels of the present invention may also be arranged at an incline or may alternately be on the same plane as the mold cavities, such as in a hub-and-spokes distribution.

The continuous molding system of the present disclosure is particularly suited to operation at substantially constant pressure while each mold cavity is filled. The present disclosure also recognizes that there may be a desire to make minor adjustments to pressure of molten polymeric material entering individual mold cavities based on real-time measurements. The feed channels may be provided with metering gates or controllable valves, such as ball valves, needle valves, or metering plates, that can be actuated in a manner that results in an increase in pressure of molten polymeric material delivered to the inlet of the mold cavity associated with that inclined feed channel, while maintaining the delivery of molten polymeric material at substantially constant pressure to the inlets of the mold cavities in fluid communication with the feed channels upstream (among the plurality of closed mold cavities) of the mold cavity.

A substantially constant pressure injection molding system enables the packing phase of injection molding to occur simultaneously with, and at the same (or substantially the same) pressure as the filling phase of injection molding, favorably reducing cycle time and avoiding the need to increase pressure at the end of fill to avoid detrimental effects due to shrinkage upon cooling of injection molded products. However, it is still desirable, even in a substantially constant pressure multi-cavity injection molding system, to be able to have the ability to make finite adjustments to pressures of molten polymeric material introduced to the mold cavities. Some injection molding systems control pressure by regulating the rate of rotation of an extruder system upstream of a nozzle and manifold or feed system. A drawback of such systems is that there is an inherent lag between a sensed condition (e.g., pressure, temperature, viscosity, or flow rate) at a particular location, such as at a gate, a mold cavity inlet, or at locations along an interior of a mold cavity, and a pressure adjustment because it takes some time, even assuming the controller is able to instantaneously process a signal from a sensor indicative of a sensed condition warranting a change in pressure and instruct the extruder system to change its velocity to compensate, it takes some time before the resulting pressure change is realized at the sensed location, due to the time it takes molten polymeric material to travel distance from the extruder system to the sensed location. U.S. patent application Ser. No. 13/476,047, entitled "Alternative Pressure Control for a Low Constant Pressure Injection Molding Apparatus," the entirety of which is incorporated herein by reference, discloses and describes the use of an active, closed loop controller to regulate and achieve a substantially constant pressure of molten polymeric material, as well as other pressure regulating devices to maintain a substantially constant melt pressure. For instance, a pressure relief valve having a set point lower than the melt pressure on a melt holder side of the pressure relief valve is disclosed that vents out a portion of molten polymeric material through a pressure relief outlet when the pressure of the molten polymeric material exceeds a set point of the pressure relief valve.

With the ability to actuate the controllable valves of the individual feed channels of the present disclosure, the continuous molding system facilitates more-instantaneous corrections or pressure adjustments as compared to closed loop controllers that regulate the rate of rotation of an extruder system of an injection mold system, since those pressure adjustments are being made by way of a valve disposed immediately upstream of an inlet of the mold cavity. In this respect, the controllable valves of the individual feed channels of the continuous molding system of the present disclosure offer a pressure adjustment very close to the inlet of the mold cavities, similar to a benefit realized by the pressure relief valves of U.S. application Ser. No. 13/476,047. Additionally, the individually-actuable control valves offer greater flexibility in mold operation, as they are not limited to a single set point, but rather, can be variably opened or closed to desired extents in order to make real-time adjustments to pressure. An extruder system of the continuous molding system can add a pressure boost if needed in addition to the pressure created by rotation. Additionally, a step filling process using valving can provide better injection control. The on/off (valve control) can be at the extruder, nozzle or at each cavity.

In continuous injection molding, each cavity can be fed through a rotating feed system. Within that feed system, each feed line can be regulated by a hydraulic or pneumatic valve. Such a rotating feed system has the ability to restrict or shut-off.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

The term "injection point" as used herein is the location in the molding apparatus where the shot comprising molten thermoplastic material enters the mold cavity. For example, for a molding apparatus having a single mold cavity coupled to a nozzle, the injection point can be at or adjacent to the nozzle. Alternatively, for a molding apparatus having a plurality of mold cavities and a runner system for transporting the molten thermoplastic material from the nozzle to each of the mold cavities, the injection points can be the points of contact between the runner system and each of the individual mold cavities. The shot comprising molten thermoplastic material is maintained at the substantially constant melt pressure as it is transported through the runner system. In general, the runner system is a heated runner system that maintains the melt temperature of the shot comprising molten thermoplastic material as it is transported to the mold cavities.

Figure 1:
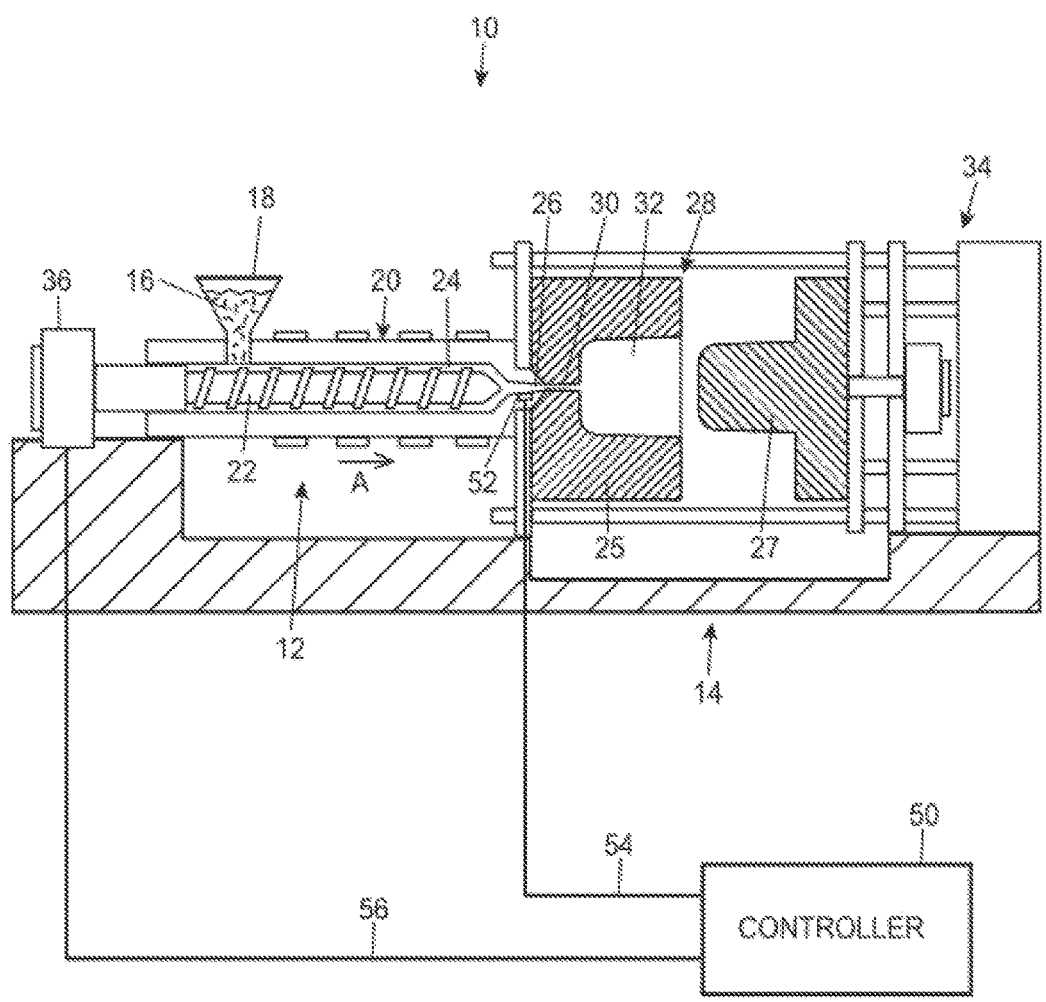

The term "low pressure" as used herein with respect to melt pressure of a thermoplastic material, means melt pressures in a vicinity of a nozzle of an injection molding machine of approximately 15,000 psi and lower.

The term "melt" as used herein refers to molten material, which is typically a polymeric material, transported through a feed system into mold cavities, where it solidifies into finished parts.

The term "melt pressure" as used herein refers to a pressure of a shot comprising molten thermoplastic material as it is injected into and fills a mold cavity of a molding apparatus. During filling of substantially the entire mold cavity, the melt pressure of the shot comprising molten thermoplastic material is maintained substantially constant. The term "mold cavity pressure" as used herein refers to the pressure within a closed mold cavity. The mold cavity pressure can be measured, for example, using a pressure transducer placed inside the mold cavity. In embodiments of the method, prior to injection of the shot comprising molten thermoplastic material into the mold cavity, the mold cavity pressure is different than the pre-injection pressure of the shot comprising molten thermoplastic material. For example, the mold cavity pressure can be less than the pre-injection pressure of the shot comprising molten thermoplastic material. In another embodiment, the mold cavity pressure can be greater than the pre-injection pressure of the shot comprising molten thermoplastic material. For example, the mold cavity pressure prior to injection can be at least 10%, at least 15%, at least 20%, at least 25%, at least 30%, at least 40%, or at least 50% different (greater or less than) than the pre-injection pressure of the shot comprising molten thermoplastic material. In one embodiment, the mold cavity pressure is at least 15 psi different (greater or less than) the pre-injection pressure of the shot comprising molten thermoplastic material. In various embodiments, the mold cavity pressure prior to injection can be atmospheric pressure. In other embodiments, the mold cavity pressure can have a pressure greater than atmospheric pressure. In yet another embodiment, the mold cavity can be maintained at a vacuum prior to injection.

The term "motivation" as used herein refers to a means by which the melt is made to move from a press nozzle into part cavities. This may be achieved through either positive displacement or positive pressure means, or a combination thereof.

The term "no-flow temperature" as used herein refers to the temperature at which the viscosity of the thermoplastic material is so high that it effectively cannot be made to flow.

The term "pre-injection pressure" as used herein with respect to the shot comprising molten thermoplastic material refers to the pressure of the thermoplastic material after it has been heated into a molten state in the heated barrel and prepared into the shot, and just prior to injection of the shot comprising the molten thermoplastic material into the mold cavity or a runner or feed system in fluid communication with the nozzle and the mold cavity. The pre-injection pressure of the shot comprising molten thermoplastic material can optionally be unequal to the pressure of the mold cavity prior to injection. In one embodiment, prior to injection the mold cavity can be at atmospheric pressure, for example. In another embodiment, the mold cavity can have a slight positive pressure. In yet another embodiment a vacuum can be induced in the mold cavity.

The term "substantially constant pressure" as used herein with respect to a melt pressure of a thermoplastic material, means that deviations from a baseline melt pressure do not produce meaningful changes in physical properties of the thermoplastic material. For example, "substantially constant pressure' includes, but is not limited to, pressure variations for which viscosity of the melted thermoplastic material does not meaningfully change. The term "substantially constant" in this respect includes deviations of approximately 30% from a baseline melt pressure. For example, the term "a substantially constant pressure of approximately 4600 psi" includes pressure fluctuations within the range of about 6000 psi (30% above 4600 psi) to about 3200 psi (30% below 4600 psi). A melt pressure is considered substantially constant as long as the melt pressure fluctuates no more than 30% from the recited pressure.

The term "valve" refers to a mechanism that regulates the mass flow of melt through a point in a feed system, including the ability to completely block flow. A valve may take the form of a rotatable ball valve, gate valve, butterfly valve, needle valve, iris-type valve, flap valve, reed valve, flapper valve, diaphragm valve, disc valve, check (ball-type) valve, check (ring-type) valve, duckbill valves, or some other type of valve.

Figure 2:
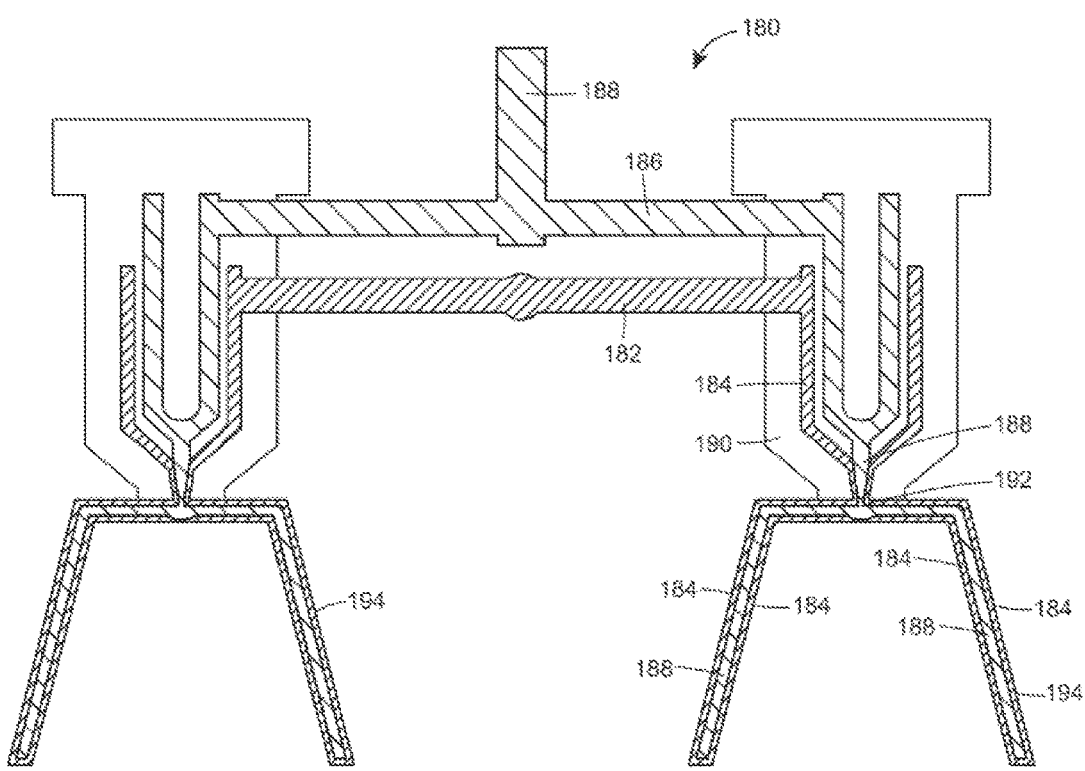
Figure 3:
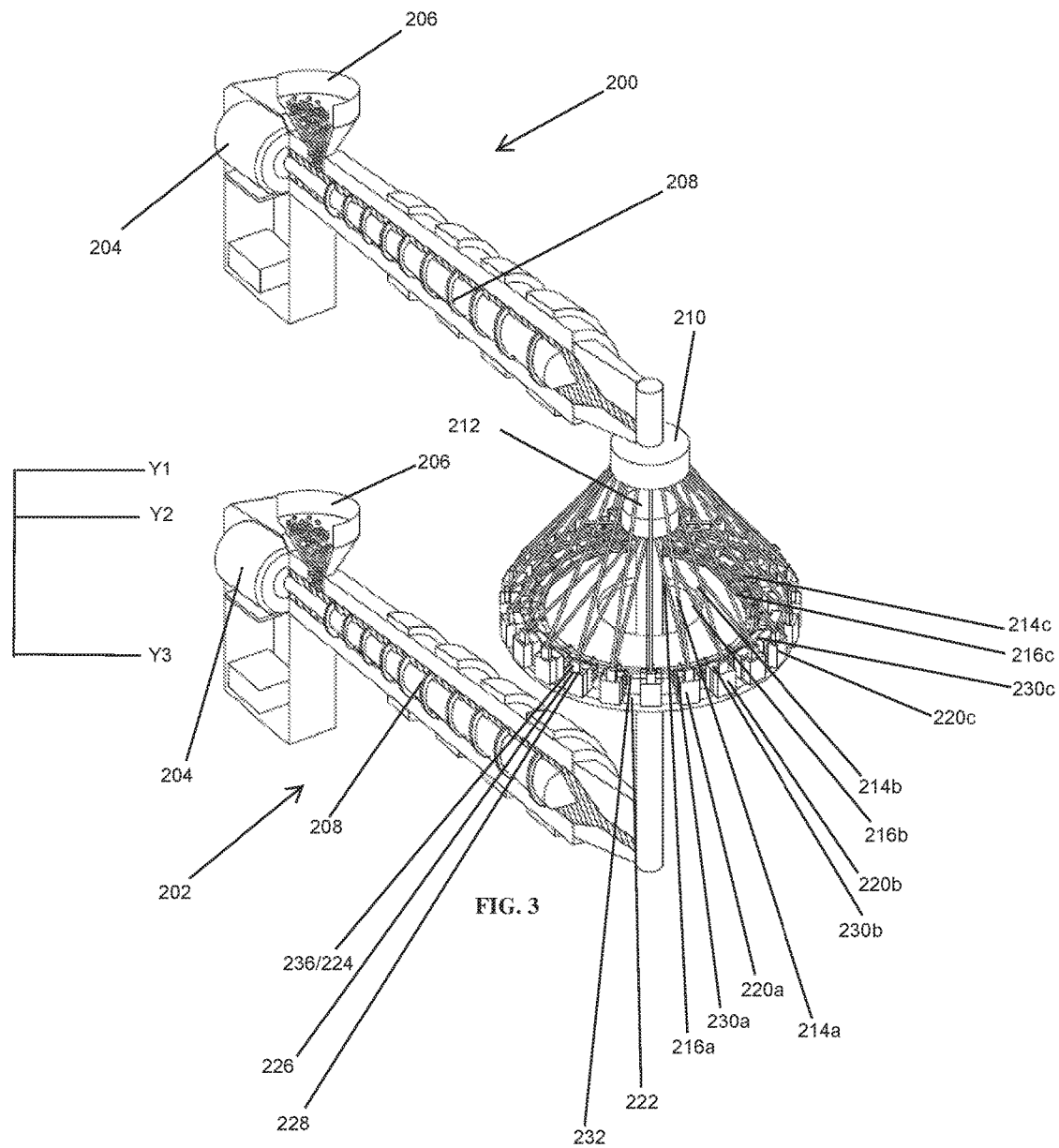
Figure 3A:
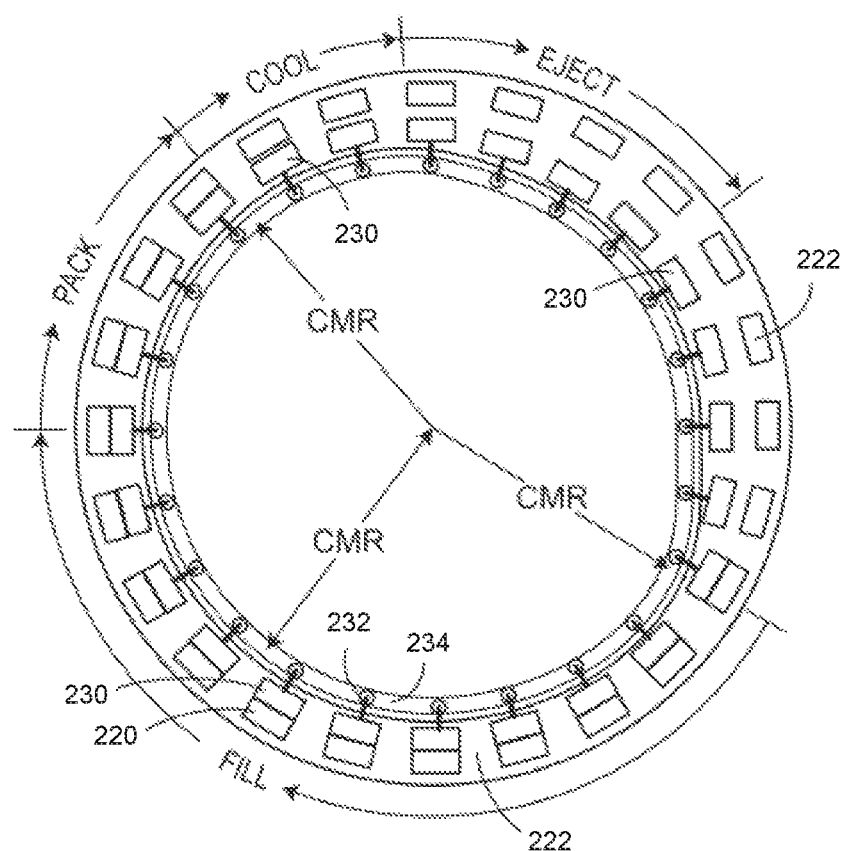
Figure 3B:
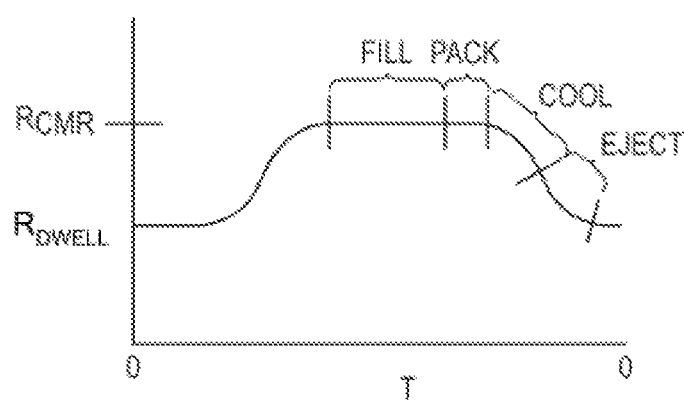
Figure 4:
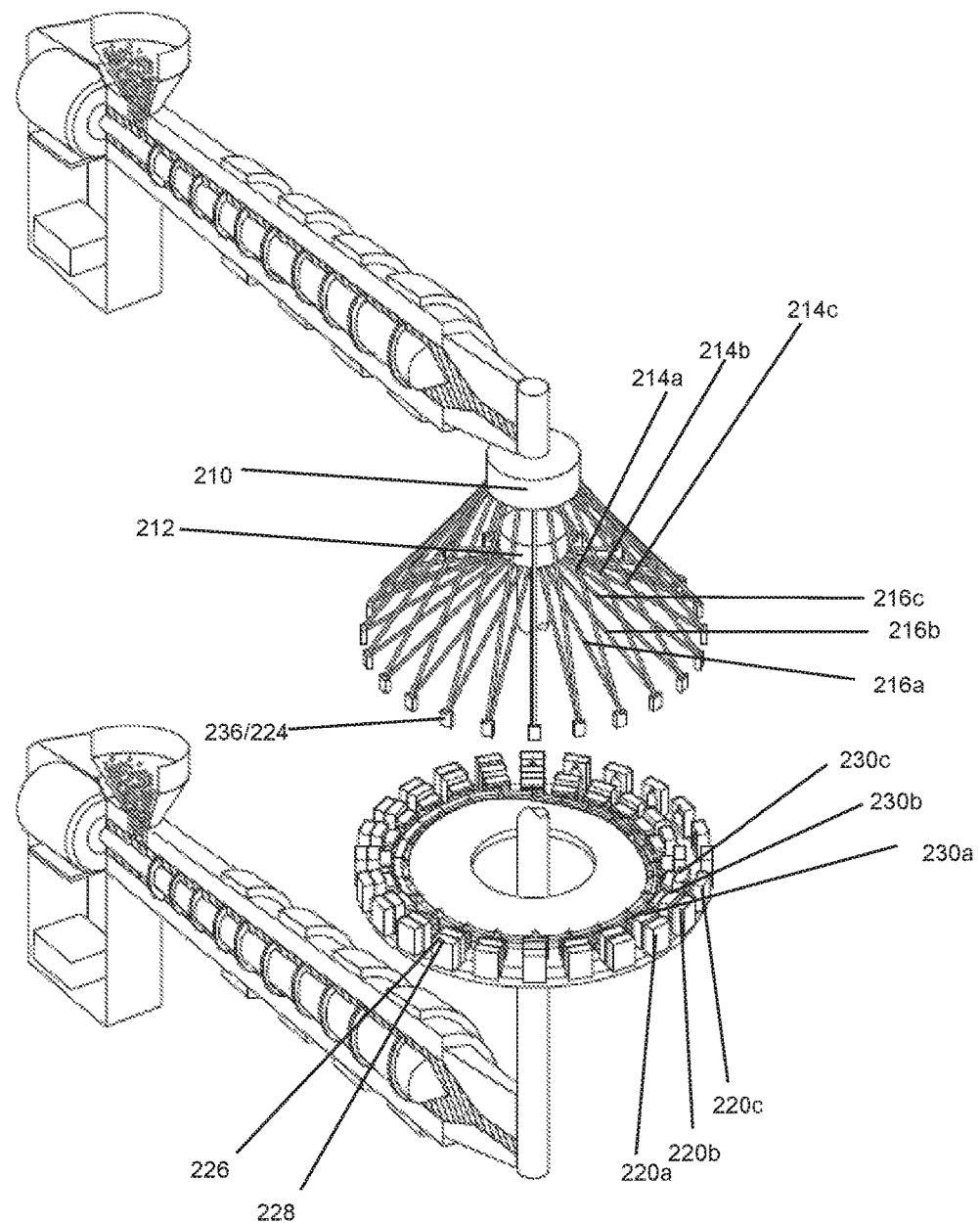
Figure 5:
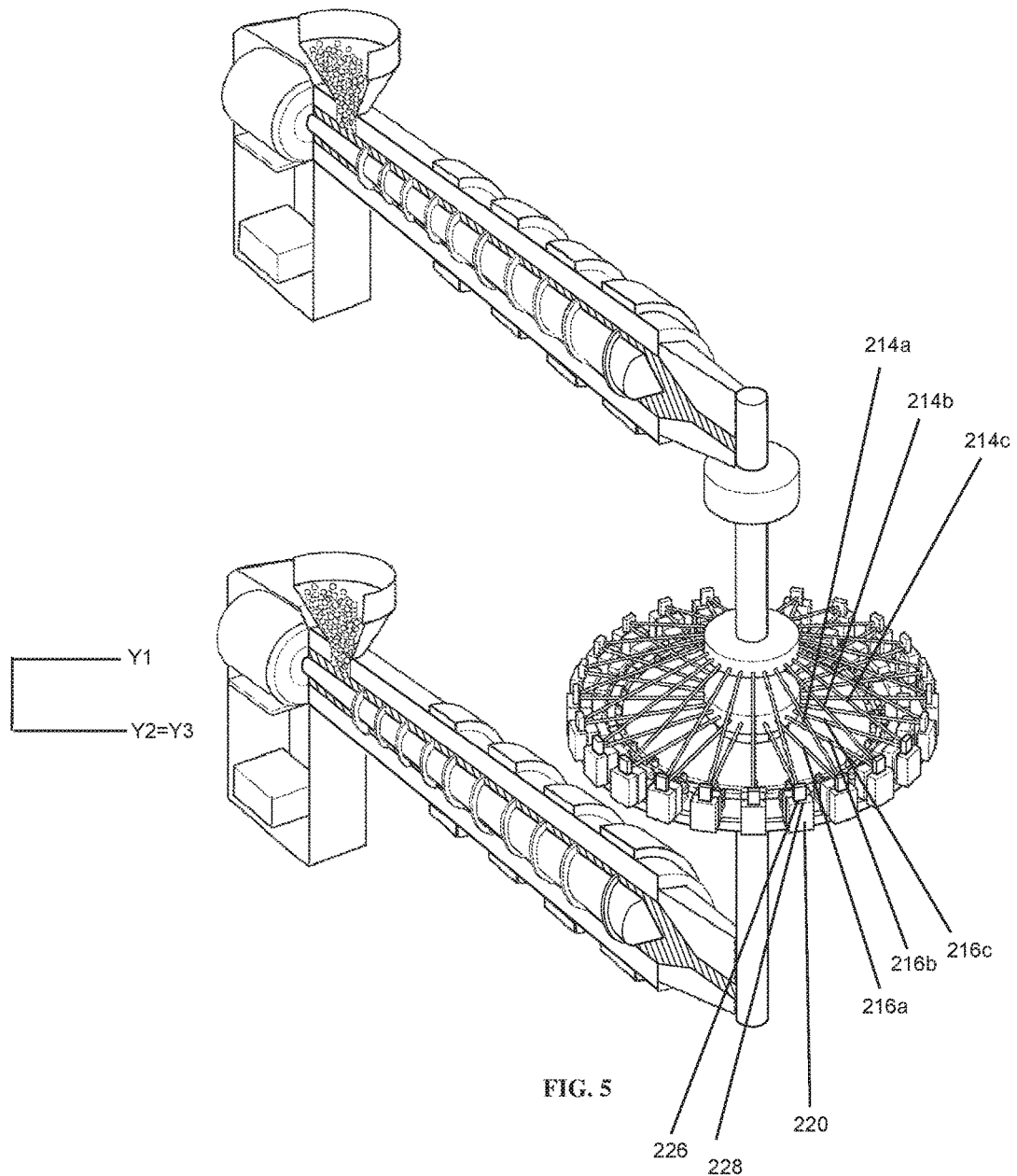
Figure 6:
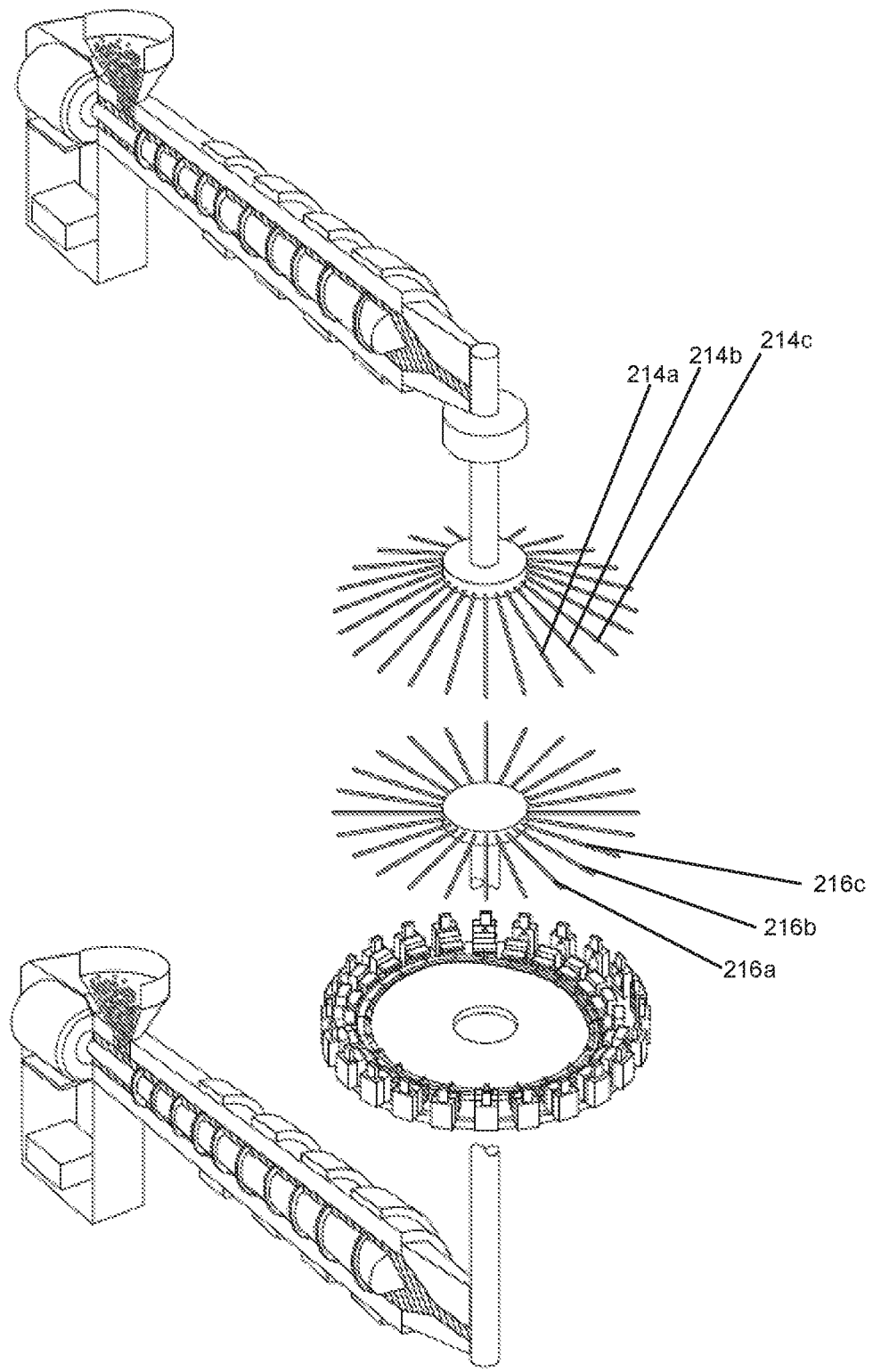
Figure 7:
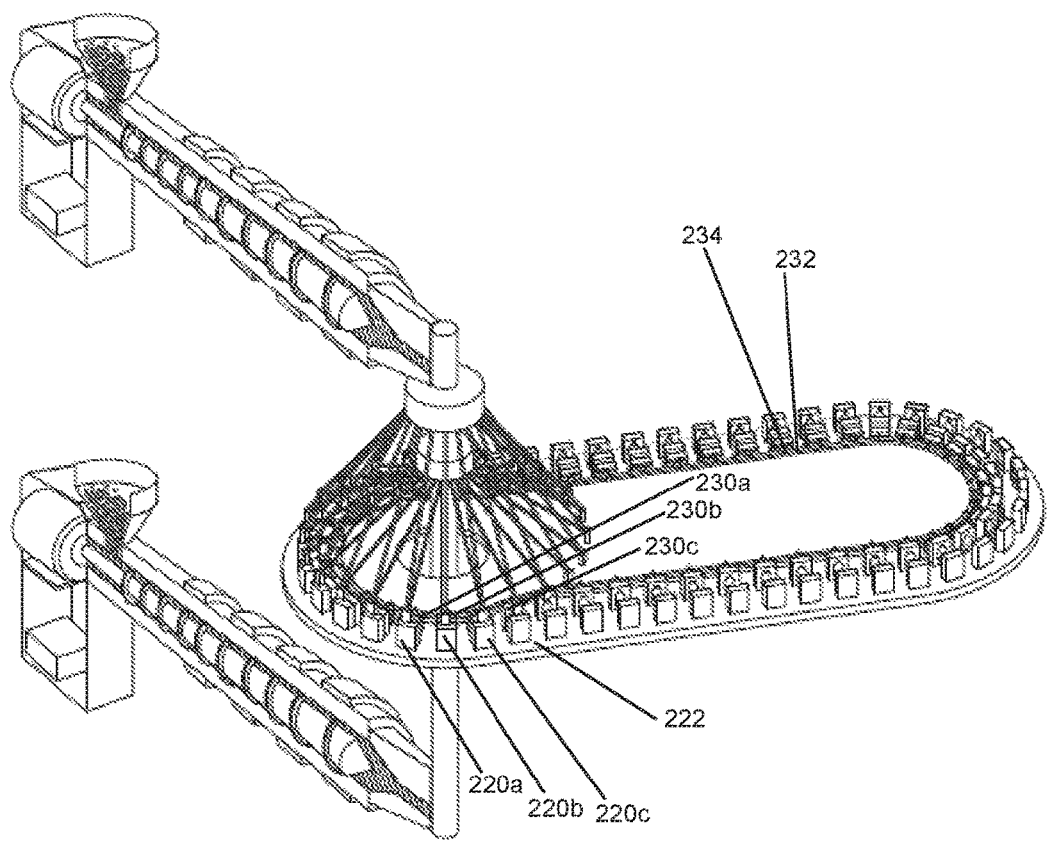

FIG. 1 illustrates a diagrammatic front view of an exemplary low constant pressure injection molding apparatus;

FIG. 2 is a cross-sectional view of a molding assembly including a multi-cavity mold and a co-injection manifold;

FIG. 3 is a perspective view of a continuous co-injection molding system of the present disclosure comprising a first pump that provides a continuous supply of a first molten polymeric material in combination with a plurality of upper feed channels disposed at a steep angle relative to the molds and a second pump that provides a continuous supply of a second molten polymeric material in combination with a plurality of lower feed channels disposed at a lesser angle relative to the molds;

FIG. 3A is a top view of the embodiment of FIG. 3 and illustrates a rotary cavity/core plate having a cam track therein;

FIG. 3B is a plot illustrating the radius of the cam track over time during one revolution of a mold core about the nozzles of the continuous supplies of molten polymeric materials of FIG. 3;

FIG. 4 is an exploded view of the continuous co-injection molding system of the present disclosure depicted in FIG. 3;

FIG. 5 is a perspective view of a continuous co-injection molding system of the present disclosure comprising a first pump that provides a continuous supply of a first molten polymeric material in combination with a plurality of upper feed channels disposed at an angle relative to the molds and a second pump that provides a continuous supply of a second molten polymeric material in combination with a plurality of lower feed channels disposed in the same plane as the molds;

FIG. 6 is an exploded view of the continuous co-injection molding system of the present disclosure depicted in FIG. 5;

FIG. 7 is a perspective view of a continuous co-injection molding system according to an alternate embodiment of the present disclosure.

DETAILED DESCRIPTION OF THE INVENTION

Embodiments of the present disclosure can use any and all embodiments of materials, structures, and/or features, methods, and materials for injection molding at substantially constant pressure as disclosed in the following US patent applications:

U.S. patent application Ser. No. 13/476,045, entitled Apparatus and Method for Injection Molding at Low Constant Pressure, U.S. patent application Ser. No. 13/601,307, entitled Apparatus and Method for Injection Molding at Low Constant Pressure, U.S. patent application Ser. No. 13/476, 047, entitled Alternative Pressure Control for a Low Constant Pressure Injection Molding Apparatus, U.S. patent application Ser. No. 13/774,571, entitled Injection Molding System Having Simplified Cooling, U.S. patent application Ser. No. 13/476,073, entitled Non-Naturally Balanced Feed System for an Injection Molding Apparatus, Ser. No. 13/476, 197, entitled Method for Injection Molding at Low, Substantially Constant Pressure, Ser. No. 13/476,178, entitled Method for Injection Molding at Low, Substantially Constant Pressure, U.S. patent application Ser. No. 13/601,338, entitled Method for Injection Molding at Low, Substantially Constant Pressure, U.S. patent application Ser. No. 13/774, 692, entitled High Thermal Conductivity Co-Injection Molding System, U.S. patent application Ser. No. 13/601, 359, entitled Injection Mold Having A Simplified Evaporative Cooling System or a Simplified Cooling System With Exotic Cooling Fluids, U.S. patent application Ser. No. 13/765,425, entitled Injection Mold Having A Simplified Evaporative Cooling System or a Simplified Cooling System With Exotic Cooling Fluids, U.S. patent application Ser. No. 13/476,584, entitled Method and Apparatus for Substantially Constant Pressure Injection Molding of Thinwall Parts, U.S. patent application Ser. No. 13/601,514, entitled Method and Apparatus for Substantially Constant Pressure Injection Molding of Thinwall Parts, U.S. patent application Ser. No. 13/672,246, entitled Injection Mold with Failsafe Mechanism, U.S. patent application Ser. No. 13/682,456, entitled A Method for Operating A High Productivity Injection Molding Machine, U.S. Provisional Appl. No. 61/728, 764, entitled Methods of Molding Compositions of Thermoplastic Polymer and Hydrogenated Castor Oil, U.S. Provisional Appl. No. 61/729,028, entitled Reduced Size Runner for an Injection Mold System.

FIG. 1 illustrates an exemplary low constant pressure injection molding apparatus 10 for producing thin-walled parts in high volumes (e.g., a class 101 or 102 injection mold, or an "ultra high productivity mold"). The injection molding apparatus 10 generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a extruder system 22. The heating of the heated barrel 20 and the compression of the thermoplastic pellets 16 by the extruder system 22 causes the thermoplastic pellets 16 to melt, forming a molten thermoplastic material 24. The molten thermoplastic material is typically processed at a temperature of about 130° C. to about 410° C.

The extruder system 22 forces the molten thermoplastic material 24, toward a nozzle 26 to form a shot of thermoplastic material, which will be injected into a mold cavity 32 of a mold 28. The molten thermoplastic material 24 may be injected through a gate 30, which directs the flow of the molten thermoplastic material 24 to the mold cavity 32. The mold cavity 32 is formed between first and second mold parts 25, 27 of the mold 28 and the first and second mold parts 25, 27 are held together under pressure by a press or clamping unit 34. The press or clamping unit 34 applies a clamping force in the range of approximately 1000 psi to approximately 6000 psi during the molding process to hold the first and second mold parts 25, 27 together while the molten thermoplastic material 24 is injected into the mold cavity 32. To support these clamping forces, the clamping system 14 may include a mold frame and a mold base, the mold frame and the mold base being formed from a material having a surface hardness of more than about 165 BHN and preferably less than about 260 BHN, although materials having surface hardness BHN values of greater than 260 may be used as long as the material is easily machineable, as discussed further below.

Once the shot of molten thermoplastic material 24 is injected into the mold cavity 32, the extruder system 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold parts 25, 27, the first and second mold parts 25, 27 are separated from one another, and the finished part may be ejected from the mold 28. The mold 28 may include a plurality of mold cavities 32 to increase overall production rates.

A controller 50 is communicatively connected with a sensor 52 and a screw control 36. The controller 50 may include a microprocessor, a memory, and one or more communication links. The controller 50 may be connected to the sensor 52 and the screw control 36 via wired connections 54, 56, respectively. In other embodiments, the controller 50 may be connected to the sensor 52 and screw control 36 via a wireless connection, a mechanical connection, a hydraulic connection, a pneumatic connection, or any other type of communication connection known to those having ordinary skill in the art that will allow the controller 50 to communicate with both the sensor 52 and the screw control 36.

In the embodiment of FIG. 1, the sensor 52 is a pressure sensor that measures (directly or indirectly) melt pressure of the molten thermoplastic material 24 in the nozzle 26. The sensor 52 generates an electrical signal that is transmitted to the controller 50. The controller 50 then commands the screw control 36 to advance the screw 22 at a rate that maintains a substantially constant melt pressure of the molten thermoplastic material 24 in the nozzle 26. While the sensor 52 may directly measure the melt pressure, the sensor 52 may measure other characteristics of the molten thermoplastic material 24, such as temperature, viscosity, flow rate, etc, that are indicative of melt pressure. Likewise, the sensor 52 need not be located directly in the nozzle 26, but rather the sensor 52 may be located at any location within the injection system 12 or mold 28 that is fluidly connected with the nozzle 26. If the sensor 52 is not located within the nozzle 26, appropriate correction factors may be applied to the measured characteristic to calculate the melt pressure in the nozzle 26. In yet other embodiments, the sensor 52 need not be fluidly connected with the nozzle. Rather, the sensor could measure clamping force generated by the clamping system 14 at a mold parting line between the first and second mold parts 25, 27. In one aspect the controller 50 may maintain the pressure according to the input from sensor 52. The sensor can be hard wired as a stationary sensor or can be a moving sensor. The sensor can be used to sense all cavities rather than one or two. Additionally the sensors can be used on a wide variety of molds.

Although an active, closed loop controller 50 is illustrated in FIG. 1, other pressure regulating devices may be used instead of the closed loop controller 50. For example, a pressure regulating valve (not shown) or a pressure relief valve (not shown) may replace the controller 50 to regulate the melt pressure of the molten thermoplastic material 24. More specifically, the pressure regulating valve and pressure relief valve can prevent overpressurization of the mold 28. Another alternative mechanism for preventing overpressurization of the mold 28 is an alarm that is activated when an overpressurization condition is detected.

FIG. 2 illustrates an exemplary low constant pressure co-injection manifold 180. The manifold includes a first machine nozzle path 182 for a first material 184, used to form inner and outer walls or "skin layer" of a molded product, and a second machine nozzle path 186 for a second material 188, used to form a core of the molded product. The co-injection manifold 180 includes a co-injection tip 190 that nests the second machine nozzle path 186 within the first machine nozzle path 182 at the hot tip orifice 192 for entry of the first and second materials 184, 188 into each mold cavity 194. Because the injection molding assembly operates at low constant pressure, i.e. an injection pressure less than 15,000 psi, the first and second materials 184, 188 are introduced into the mold cavity 194 at a constant flow rate and form a uniform flow front that fills the mold cavity 194 from the hot tip orifice 192 to the opposite end 196 of the mold cavity.

The first material 184 may be molded so as to have a skin layer thickness of as little as 0.1 mm without the second material 188 surging past or bursting through the skin layer. The ability to co-inject materials having such a thin skin layer permits greater use of polylactic acid (PLA), starch, acrylics, post-consumer recyclables (PCR), and post-industrial recyclables (PIR) in injection molded products, despite their inferior physical properties, such as brittleness of PLA, moisture sensitivity of starch and acrylics, and odor and discontinuities in PCR, because these materials, which are employed as the second (core) material 188, are shielded from view, shielded from contact with consumable products to be dispensed in consumer product containers, and shielded from contact with the skin of a user, by the skin layer, which may be a virgin material having superior physical properties, such as EVOH or nylons.

FIG. 3 illustrates a first screw pump 200 suitable for supplying a continuous flow of a first molten polymeric material and a second screw pump 202 for supplying a continuous flow of a second polymeric material into a plurality of mold cavities 220. The first screw pump 200 and the second screw pump 202 may each include a rotary motor 204, a hopper 206, and a screw 208. The first screw pump 200 may further include a first nozzle 210 and the second screw pump 202 may further include a second nozzle 212. The first screw pump 200 and/or the second screw pump 202 may be in the form of, or similar to, an extruder. The first nozzle 210 is provided at a first elevation $Y_1$ and is in fluid communication with a plurality of inclined upper feed channels 214 (which, from left-to-right in the drawing figure, are referenced as 214a, 214b, ..., 214n) disposed in a conical distribution at least partially around and depending downwardly from the first nozzle 210. The plurality of upper feed channels 214a, 214b, ..., 214n, may be supported by a first rotating conical feed channel plate (not pictured). The second nozzle 212 is provided at a second elevation $Y_2$, which is less than $Y_1$, and is in fluid communication with a plurality of lower feed channels 216. The lower feed channels 216a, 216 b, ..., 216 n, may be supported by a second rotating conical feed channel plate (not pictured). The lower feed channels 216 in the embodiment depicted in FIG. 3 are also inclined and disposed in a conical distribution at least partially around and depending downwardly from the second nozzle 212. Alternately, the lower feed channels 216 may extend horizontally outward from the second nozzle 212 in the same horizontal plane as the second nozzle 212 in a hub-and-spokes configuration at least partially around the second nozzle 212.

The first nozzle 210 and the second nozzle 212 are aligned in the same vertical axis. A plurality of mold cavities 220a, 220b, ..., 220n rotate along a mold cavity/core plate 222 at least part-way around the vertical axis containing the first nozzle 210 and the second nozzle 212. The mold cavities 220 may comprise a metering plate comprising valves or metering gates 236, and may also comprise a co-injection manifold 224 such as that depicted in FIG. 2. A co-injection manifold 224 is advantageous when a laminar structure through the wall of a part is desired because a co-injection 224 manifold introduces two or more polymeric materials simultaneously with the option to vary the proportional relationship of the polymeric materials through a single inlet 226 into the mold cavity 220. A co-injection manifold 224 may or may not be used when sequential co-injection, which varies the distribution of each polymeric material along the flow direction, is being used. Sequential co-injection is used, for example, to co-inject two polymeric materials that are identical but pigmented differently.

The mold cavities are each at least partially defined by one wall. If a co-injection manifold 224 is being used, the upper feed channels 214 supply the first molten polymeric material to the co-injection manifold 224 and the lower feed channels 216 supply the second molten polymeric material to the co-injection manifold 224. If the goal is to achieve a laminar structure through the wall of a part, a single inlet 226, such as a sprue disposed intermediate the co-injection manifold 224 and the respective mold cavity 220, then supplies both the first and second polymeric materials to the mold cavity 220. If instead sequential co-injection is occurring with use of a co-injection manifold, a first inlet 226, such as a sprue disposed intermediate the co-injection manifold 224 and the respective mold cavity 220, supplies the first molten polymeric material to the mold cavity 220, and a second inlet 228, such as a second sprue disposed intermediate the co-injection manifold 224 and the respective mold cavity 220, supplies the second molten polymeric material to the mold cavity 220.

If no co-injection manifold is being used, a first inlet 226, such as a first sprue disposed intermediate each of the upper feed channels 214 and respective mold cavities 220, supplies the first molten polymeric material to the mold cavity 220, and a second inlet 228, such as a second sprue disposed intermediate each of the lower feed channels 216 and the respective mold cavities 220, supplies the second molten polymeric material to the mold cavity 220. To this end, at a lower end of each of the inclined upper feed channels 214, the inclined upper feed channel 214 is in selective or permanent fluid communication with the first inlet 226 of the mold cavity 220. Likewise, at an end of each of the lower feed channels 216, the lower feed channel 216 is in communication with the second inlet 228 of the mold cavity 220. The first inlet 226 and the second inlet 228 of the mold cavities 220 are located at or near a third elevation $Y_3$ that is lower than the first elevation $Y_1$ of the first nozzle 210 and may be lower than or equal to the second elevation $Y_2$ of the second nozzle 212. While illustrated in FIG. 3 at the top of the mold cavity 220, it is recognized that the first inlet 226 and second inlet 228 of the mold cavity 220 may be positioned at any desired height of the mold cavity 220, such as at the bottom or at a mid-point of the mold cavity 220.

In one embodiment, as illustrated in FIG. 3, the mold cavities 220a, 220b, . . . , 220n are disposed in a complete circle or revolution about the vertical axis containing the first nozzle 210 and the second nozzle 212. Each mold cavity 220a, 220b, . . . , 220n has a respective mold core 230a, 230b, . . . , 230n associated therewith, and at least one of each of the mold cavities 220a, 220b, . . . , 220n and mold cores 230a, 230b, . . . , 230n is actuable relative to the respective mold core 230 or mold cavity 220, such that the mold cavity 220 and mold core 230 form a tightly-sealed molding chamber at least during the portion of the revolution of the mold cavity/core plate 222 during which first molten polymeric material is being delivered by a respective inclined upper feed channel 214 and second molten polymeric material is being delivered by a lower feed channel 216. For instance, each of the mold cores 230a, 230b, . . . , 230n may have associated therewith a cam follower roller 232 that rides in a cam track 234 in the mold cavity/core plate 222, while each mold cavity 220, according to this embodiment, travels (i.e., revolves) in a fixed radius about the vertical axis containing the first nozzle 210 and the second nozzle 212.

As illustrated in FIG. 3A, the cam track 234 has a constant maximum radius CMR along a portion of the mold cavity/core plate 222 that extends from an angular position at least immediately upstream of (i.e. just prior to) initiation of molding to at least immediately beyond an angular position at which a mold cavity 220 is packed or at least filled. Along portions of the cam track 234 corresponding to non-molding positions (i.e., along an arcuate region of the mold cavity/core plate 222 during which no filling or packing of the mold cavities 220 is taking place), the radius of the cam track 234 reduces to a dwell region, along which the mold cores 230 are fully separated from the respective mold cavities 220. The region of the cam track 234 where the radius of the cam track 234 reduces from $R_{CMR}$ to $R_{DWELL}$ causes the mold cores 230 to move radially inwardly, resulting in separation of the mold cavities 220 and mold cores 230, thereby facilitating cooling and ejection of molded parts from the mold cavities 220. After ejection of the molded parts from each of the mold cavities 220, each of the respective mold cores 230 and mold cavities 220 begin a new revolution or cycle, thereby closing together to again form a tightly-sealed molding chamber that is brought into fluid communication with respective upper feed channels 214 and lower feed channels 216 so as to be ready to receive additional molten polymeric material (i.e., to mold an additional part).

As used herein, the term "arcuate" when describing the disposition of mold cavities 220 relative to the nozzles 210 and 212 along the cam track 234 refers to a region having a substantially constant radius relative to the nozzle, along an arc length of at least 15°, up to and including 360° (i.e., a circular arrangement).

The radius of the cam track 234 over the time to complete a full revolution of a given mold cavity 220 and respective mold core 230 about the vertical axis containing the first nozzle 210 and the second nozzle 212 is plotted in FIG. 3B, with identification of molding operations that would occur along the respective regions of the cam track 234. If desired, alternate pairs of mold cavities and mold cores could travel along different cam tracks, which may be desired to facilitate performing a particular operation on a plurality of mold cavities simultaneously. For instance, odd mold cores 230a, 230c, 230e, . . . 230n could have cam followers $232_{odd}$ riding along a first cam track $234_{odd}$ and even mold cores 230b, 230d, 230f, . . . , 230n+1 could have cam followers $232_{even}$ riding along a second cam track $234_{even}$ having a similar cam profile to that of the first cam track $234_{odd}$, but slightly offset, such that pairs of odd and even mold cores 230n and 230n+1 undergo the same operations at the same time, either through portions of a revolution, or through an entire revolution, of the mold cores 230 about the vertical axis containing the first nozzle 210 and the second nozzle 212. The second cam track $234_{even}$ may have a smaller maximum radius CMR than the first cam track $234_{odd}$ and the links between the cam followers $232_{even}$ and their respective mold cores 230b, 230d, 230f, . . . , 230n+1 may be longer than the links between the cam followers $232_{odd}$ and their respective mold cores 230a, 230c, 230e, . . . 230n to avoid cam followers from one of the cam tracks switching to the other cam track or otherwise impeding smooth revolutions of the mold cores 230 about the vertical axis containing the first nozzle 210 and the second nozzle 212.

The rate at which molten polymeric material in a upper feed channel 214 or lower feed channel 216 is introduced to a first inlet 226 or a second inlet 228 of a respective mold cavity 220 can be controlled by metered gates or valves 236. The valves 236 may take the form of a rotatable ball gate valve. Alternately, gate valves, butterfly valves, needle valves, iris-type valves, flap valves, reed valves, flapper valves, diaphragm valves, disc valves, check (ball-type) valves, check (ring-type) valves, duckbill valves, or some other type of valves could be employed. Ball gate valves and needle valves most easily allow fine control over flow rate, but the other types of valves may be used. The position of the valves 236 may be controlled by a controller, such as a servo-drive controller, so as to dynamically adjust the position of the valves 236 as the upper feed channel 214, lower feed channel 216, and mold cavity 220 reach particular locations along the arc length of the mold cavity/core plate 222. Alternately, the rotating conical feed channel plates, metering plates, or some external structures may be provided with a camming or triggering mechanism, such as an electromagnetic switch, that imparts a change to the valve position at a given location along the arc length of the mold cavity/core plate 222.

When the valves 236 are fully open, the molten polymeric material is free to flow from the upper feed channel 214 and/or the lower feed channel 216 into the respective mold cavity 220 at a nominal pressure. As the valve 236 is actuated from its fully-open state to a partially closed state, the construction causes the pressure of the molten polymeric material downstream of the valve 236 (i.e., the pressure of the melt as it flows into the mold cavity) to decrease.

In order to detect pressure of molten polymeric material entering each mold cavity to ensure a constant pressure is being maintained in each mold cavity 220, and to make adjustments as-needed to correct for any unacceptable variances from the desired constant pressure, one or more pressure sensors (not shown) can be provided in fluid communication with the interior of each of the mold cavities 220. In a carousel-type multi-cavity injection molding system as disclosed herein, there is a need to enable the pressure signals to be transmitted by each of the pressure sensors, notwithstanding the fact that the pressure sensors are rotating together with the mold cavities 220. There are several alternatives to hard-wired communication of pressure signals from the plurality of pressure sensors associated with the mold cavities 220. For instance, each of the pressure sensors may communicate a pressure signal using a radio frequency relay (e.g., RFID), or a BLUTOOTH or Wifi signal could be utilized to transmit the pressure signal to a central controller that, based on the pressure signals, can make adjustments to valve positions of the valves 236 as needed to obtain desired pressure in individual mold cavities 220. In a particular embodiment, in lieu of a wired connection a pressure sensor can make intermittent contact with one of a plurality of pressure sensor contact pads (not shown) positioned in a series along at least an arcuate portion of the carousel, with a signal corresponding to pressure measured by the pressure sensor instantaneously communicated to the pressure sensor contact pad upon such contact, which in turn communicates the sensed pressure data to the central controller.

As an alternative to providing wireless communication from a plurality of pressure sensors that dynamically move with the rotating mold cavities 220, a plurality of stationary pressure sensors may be used that have either a hard-wired or wireless communication with a central controller. For instance, a pin (not shown) in fluid communication with an interior of a mold cavity 220 could ride along the carousel with the mold cavity, but could exert pressure on a stationary transducer (not shown) positioned at a predetermined location at the periphery of the carousel. The pressure exerted on the stationary transducer by the pin would be directly proportional to the pressure of the melt within the mold cavity 220, such that the pressure detected by the stationary transducer can be communicated to the central controller and interpreted to make a determination as to whether any change to the pressure within that mold cavity 220 is needed, and if so, the central controller could send an appropriate instruction to reposition a valve 236 associated with an upper feed channel 214 and/or a valve 236 associated with a lower feed channel 216 corresponding to that mold cavity to accomplish the desired pressure change.

It is recognized that the pressure in each upper feed channel 214 and lower feed channel 216 upstream of the valves 236 can be an accurate prediction of pressure within each associated mold cavity. For instance, when there is an adjustment to a valve position, an increase in pressure detected within an upper feed channel 214 or a lower feed channel 216 upstream of the valves 236 is indicative of a pressure decrease within the mold cavity 220. As such, in addition to or instead of pressure sensors within the mold cavity 220, it is recognized that pressure sensors in each of the upper feed channels 214 and lower feed channels 216 upstream of the valves 236 in the upper feed channels 214 and lower feed channels 216 can be used to collect pressure data useful in determining whether adjustments to valve position are necessary to achieve or maintain a desired constant pressure within the mold cavities 220. Given the carousel-like arrangement of the upper feed channels 214 and lower feed channels 216, the pressure sensors disposed in the upper feed channels 214 and lower feed channels 216 would similarly benefit from some alternative to hard-wired communication with a central controller, such as wireless radio frequency relay (e.g., RFID), BLUTOOTH, or Wifi).

In addition to pressure sensors in the mold cavities 220 and/or upper feed channels 214 and lower feed channels 216 in the vicinity of the valves 236, it may be desirable to have an additional pressure sensor in each of the upper feed channels 214 and lower feed channels 216 in the vicinity of the first and second screw pumps 200 and 202 to detect pressure of molten polymeric material as it is being introduced to the upper feed channels 214 and lower feed channels 216. Data from pressure sensors indicative of pressure of molten polymeric material introduced to the upper feed channels 214 by first screw pump 200 and lower feed channels 216 by second screw pump 202 would beneficially provide a central controller with information as to whether pressure delivered by the first and second screw pumps 200 and 202 is sufficiently high to deliver the desired constant pressure to all of the downstream mold cavities 220.

FIG. 4 is an exploded view of the continuous co-injection molding system of the present disclosure depicted in FIG. 3. FIG. 4 illustrates that the first nozzle 210 from which the downwardly depending upper feed channels 214 extend and is located above the second nozzle 212 from which the downwardly depending lower feed channels 216 extend. Below the nozzles 210 and 212 are the mold cavities 220 and mold cores 230. The mold cores 230 are located radially inward of the mold cavities 220. The portions of the mold cavities 220 comprising the valves or metering gates 236 and/or the co-injection manifold 224 are located above the portions of the mold cavities 220 comprising first inlet 226 and second inlet 228.

FIG. 5 is a perspective view of a continuous co-injection molding system of the present disclosure, similar to the continuous co-injection molding system disclosed in FIG. 3 but in which the lower feed channels 216a, 216b, 216c, . . . 216n are arranged in a hub-and-spokes configuration on the same plane as the mold cavities 220. The first elevation $Y_1$ of the first nozzle 210 is greater than the second elevation $Y_2$ of the second nozzle 212, which is equal to the elevation $Y_3$ of the first inlet 226 and the second inlet 228 of the mold cavities 220.

FIG. 6 is an exploded view of the continuous co-injection molding system of the present disclosure depicted in FIG. 5. The upper feed channels 214a, 214b, 214c . . . 214n depend downwardly, while the lower feed channels 216a, 216b, 216c . . . 216n extend in a planar hub-and-spokes configuration.

FIG. 7 illustrates another embodiment in which the mold cavities 220a, 220b, . . . , 220n and respective mold cores 230a, 230b, . . . , 230n are only engaged with the mold cavity/core plate 222 along an arcuate portion thereof, such as along a half-circle. Along that arcuate region, at least one of each of the mold cavities 220a, 220b, . . . , 220n and the respective mold cores 230a, 230b, . . . , 230n is actuated into secure engagement with its respective mold core or mold cavity, such that the mold cavity 220 and mold core 230 form a tightly-sealed molding chamber at least during the portion of the revolution of the mold cavity/core plate 222 during which molten polymeric materials are being delivered by feed upper feed channels 214 and lower feed channels 216. As in the previous embodiment, a cam track 234 may be provided to actuate each mold core 230 relative to a respective mold cavity 220.

As discussed above, utilizing a controller and feedback loop to regulate the rate of a extruder system upstream of a nozzle and manifold or feed system provides a possible manner of making finite adjustments to pressure of molten polymeric material delivered to a mold cavity of a multi-cavity molding system. Instead or in addition, it is possible to employ a pressure relief valve just upstream of an inlet of a mold cavity, having a set point that enables the relief valve to vent out a portion of molten polymeric material through a pressure relief outlet when the pressure exceeds that set point. In a continuous co-injection molding system of the present disclosure, the needs for, and benefits of, the ability to control pressure in the immediate vicinity of the inlet to the mold cavity are even more acute. Because each individual mold cavity only has a limited period of arc-length about the mold cavity/core plate 222 of the carousel along which it can receive molten polymeric material, it may be necessary to effectively tune the pressure of molten polymeric material being fed by one of the the upper feed channels 214 and/or lower feed channels 216 into the inlet(s) of a respective mold cavity 220. Finite adjustments to the position of the valve(s) 236 result in immediate variations to the nominal pressure of molten polymeric material within the upper feed channel 214 and/or lower feed channel 216 as the molten material enters the mold cavity 220. These adjustments may be made in real time in response to sensed parameters or conditions within the mold cavity 220 or within the upper feed channel 214 or lower feed channel 216, such as pressure, temperature, viscosity, or flow rate. Alternatively or in addition, the adjustments may be made based on predetermined conditions that call for specific deviations from the nominal, substantially constant pressure within the upper feed channel 214 or lower feed channel 216.

For instance, it may be desirable to mold a plurality of different products, or different parts of products, in the various mold cavities 220a, 220b, 220c, . . . , 220n, using mold cavities of different volume and/or shape. For example, to facilitate downstream assembly of a multi-part cap (not shown) of a molded container for a personal hygiene product or the like, a first plurality of mold cavities, such as odd-lettered mold cavities 220a, 220c, . . . , may be sized and shaped to mold a first, relatively large component of the cap, while a second plurality of mold cavities, such as even-lettered mold cavities 220b, 220d, . . . , may be sized and shaped to mold a second, relatively small component of the cap. The time that each of the odd-lettered and even-lettered mold cavities is engaged with its respective upper feed channel 214 and lower feed channel 216 along a portion of the carousel-like mold cavity/core plate 222 during which molding can occur is the same. As such, it may be necessary to operate the valves 236 of the upper feed channels 214 and lower feed channels 216 associated with the second plurality of mold cavities (i.e., the even-lettered mold cavities 220b, 220d, . . . ) so that they are open for a shorter duration than the valves 236 of the upper feed channels 214 and lower feed channels 216 associated with the first plurality of mold cavities (i.e., the odd-lettered (relatively larger) mold cavities 220a, 220c, . . . ).

Additionally, it may be desirable to fill the first, odd-lettered plurality of mold cavities 220a, 220c, . . . , at either a higher or a lower pressure than the second, even-lettered plurality of mold cavities 220b, 220d, . . . . In order to accomplish this, the valves 236 of the upper feed channels 214 and lower feed channels 216 associated with the first plurality of mold cavities 220a, 220c, . . . can be adjusted to a different position relative to the valves 236 of the upper feed channels 214 and lower feed channels 216 associated with the second plurality of mold cavities 220b, 220d, . . . , along the arcuate portion of the carousel-like mold cavity/core plate 222 during which molding can occur.

Another advantage of being able to vary the pressure by controlled amounts during fill is the ability to offset or balance expansion in regions of varying thickness of the mold cavity, and/or to make adjustments to compensate for thermal contraction near the cavity walls. It may be particularly advantageous when molding thin-walled products, or thin-walled regions of products, to be able to make adjustments to the nominal pressure of molten polymeric material being delivered by an inclined feed channel.

Part, parts, or all of any of the embodiments disclosed herein can be combined with part, parts, or all of other injection molding embodiments known in the art, including those described below.

Embodiments of the present disclosure can be used with embodiments for injection molding at low constant pressure, as disclosed in U.S. patent application Ser. No. 13/476,045 filed May 21, 2012, entitled "Apparatus and Method for Injection Molding at Low Constant Pressure" and published as US 2012-0294963 A1, which is hereby incorporated by reference.

Embodiments of the present disclosure can be used with embodiments for pressure control, as disclosed in U.S. patent application Ser. No. 13/476,047 filed May 21, 2012, entitled "Alternative Pressure Control for a Low Constant Pressure Injection Molding Apparatus", now U.S. Pat. No. 8,757,999, which is hereby incorporated by reference.

Embodiments of the present disclosure can be used with embodiments for non-naturally balanced feed systems, as disclosed in U.S. patent application Ser. No. 13/476,073 filed May 21, 2012, entitled "Non-Naturally Balanced Feed System for an Injection Molding Apparatus" and published as US 2012-0292823 A1, which is hereby incorporated by reference.

Embodiments of the present disclosure can be used with embodiments for injection molding at low, substantially constant pressure, as disclosed in U.S. patent application Ser. No. 13/476,197 filed May 21, 2012, entitled "Method for Injection Molding at Low, Substantially Constant Pressure" and published as US 2012-0295050 A1, which is hereby incorporated by reference.

Embodiments of the present disclosure can be used with embodiments for injection molding at low, substantially constant pressure, as disclosed in U.S. patent application Ser. No. 13/476,178 filed May 21, 2012, entitled "Method for Injection Molding at Low, Substantially Constant Pressure" and published as US 2012-0295049 A1, which is hereby incorporated by reference.

Embodiments of the present disclosure can be used with embodiments for co-injection processes, as disclosed in U.S. patent application Ser. No. 13/774,692 filed Feb. 22, 2013, entitled "High Thermal Conductivity Co-Injection Molding System", which is hereby incorporated by reference.

Embodiments of the present disclosure can be used with embodiments for molding with simplified cooling systems, as disclosed in U.S. patent application Ser. No. 13/765,428 filed Feb. 12, 2013, entitled "Injection Mold Having a Simplified Evaporative Cooling System or a Simplified Cooling System with Exotic Cooling Fluids", now U.S. Pat. No. 8,591,219, which is hereby incorporated by reference.

Embodiments of the present disclosure can be used with embodiments for molding thinwall parts, as disclosed in U.S. patent application Ser. No. 13/476,584 filed May 21, 2012, entitled "Method and Apparatus for Substantially Constant Pressure Injection Molding of Thinwall Parts", which is hereby incorporated by reference.

Embodiments of the present disclosure can be used with embodiments for molding with a failsafe mechanism, as disclosed in U.S. patent application Ser. No. 13/672,246 filed Nov. 8, 2012, entitled "Injection Mold With Fail Safe Pressure Mechanism", which is hereby incorporated by reference.

Embodiments of the present disclosure can be used with embodiments for high-productivity molding, as disclosed in U.S. patent application Ser. No. 13/682,456 filed Nov. 20, 2012, entitled "Method for Operating a High Productivity Injection Molding Machine", which is hereby incorporated by reference.

Embodiments of the present disclosure can be used with embodiments for molding certain thermoplastics, as disclosed in U.S. patent application Ser. No. 14/085,515 filed Nov. 20, 2013, entitled "Methods of Molding Compositions of Thermoplastic Polymer and Hydrogenated Castor Oil", which is hereby incorporated by reference.

Embodiments of the present disclosure can be used with embodiments for runner systems, as disclosed in U.S. patent application Ser. No. 14/085,515 filed Nov. 21, 2013, entitled "Reduced Size Runner for an Injection Mold System", which is hereby incorporated by reference.

Embodiments of the present disclosure can be used with embodiments for moving molding systems, as disclosed in U.S. patent application 61/822,661 filed May 13, 2013, entitled "Low Constant Pressure Injection Molding System with Variable Position Molding Cavities:", which is hereby incorporated by reference.

Embodiments of the present disclosure can be used with embodiments for injection mold control systems, as disclosed in U.S. patent application 61/861,298 filed Aug. 20, 2013, entitled "Injection Molding Machines and Methods for Accounting for Changes in Material Properties During Injection Molding Runs", which is hereby incorporated by reference.

Embodiments of the present disclosure can be used with embodiments for injection mold control systems, as disclosed in U.S. patent application 61/861,304 filed Aug. 20, 2013, entitled "Injection Molding Machines and Methods for Accounting for Changes in Material Properties During Injection Molding Runs", which is hereby incorporated by reference.

Embodiments of the present disclosure can be used with embodiments for injection mold control systems, as disclosed in U.S. patent application 61/861,310 filed Aug. 20, 2013, entitled "Injection Molding Machines and Methods for Accounting for Changes in Material Properties During Injection Molding Runs", which is hereby incorporated by reference.

Embodiments of the present disclosure can be used with embodiments for using injection molding to form overmolded articles, as disclosed in U.S. patent application 61/918,438 filed Dec. 19, 2013, entitled "Methods of Forming Overmolded Articles", which is hereby incorporated by reference.

Embodiments of the present disclosure can be used with embodiments for controlling molding processes, as disclosed in U.S. Pat. No. 5,728,329 issued Mar. 17, 1998, entitled "Method and Apparatus for Injecting a Molten Material into a Mold Cavity", which is hereby incorporated by reference.

Embodiments of the present disclosure can be used with embodiments for controlling molding processes, as disclosed in U.S. Pat. No. 5,716,561 issued Feb. 10, 1998, entitled "Injection Control System", which is hereby incorporated by reference.

Embodiments of the present disclosure can be used with embodiments for molding preforms, as disclosed in U.S. patent application 61/952,281, entitled "Plastic Article Forming Apparatus and Methods for Using the Same", which is hereby incorporated by reference.

Embodiments of the present disclosure can be used with embodiments for molding preforms, as disclosed in U.S. patent application 61/952,283, entitled "Plastic Article Forming Apparatus and Methods for Using the Same", which is hereby incorporated by reference.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for injecting molding parts in a plurality of mold cavities, comprising:
    a source of flowing first molten polymeric material;
    a source of flowing second molten polymeric material;
    a first nozzle in communication with the source of the flowing first molten polymeric material, the first nozzle being disposed at a first elevation;

a second nozzle in communication with the source of the flowing second molten polymeric material, the second nozzle being disposed at a second elevation;

a plurality of upper feed channels in fluid communication with the first nozzle, each of the plurality of upper feed channels being in selective communication with a respective mold cavity at a respective first inlet of a plurality of first inlets;

a plurality of lower feed channels in fluid communication with the second nozzle, each of the plurality of lower feed channels being in selective communication with a respective mold cavity at a respective second inlet of a plurality of second inlets, wherein the respective first inlet is separate from the respective second inlet.

2. The system of claim 1, further comprising a plurality of first sprues, wherein each of the plurality of first sprues is intermediate each of the upper feed channels and the respective mold cavity, and a plurality of second sprues, wherein each of the plurality of second sprues is intermediate each of the lower feed channels and the respective mold cavity.

3. The system of claim 2, wherein the upper feed channels are disposed in a rotating conical distribution at least partially around, and depending downwardly from, the first nozzle.

4. The system of claim 3, wherein the lower feed channels are disposed in a rotating conical distribution, at least partially around, and depending downwardly from, the second nozzle.

5. The system of claim 3, wherein the lower feed channels are disposed in a hub-and-spoke distribution, at least partially around, and in the same horizontal plane as, the second nozzle.

* * * * *